US009419716B2

(12) United States Patent
Dupont

(10) Patent No.: US 9,419,716 B2
(45) Date of Patent: *Aug. 16, 2016

(54) VARIABLE COLOR DATA TRANSMISSION

(71) Applicant: Nicolas Thomas Mathieu Dupont, Orlando, FL (US)

(72) Inventor: Nicolas Thomas Mathieu Dupont, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,512

(22) Filed: Nov. 14, 2013

(65) Prior Publication Data

US 2015/0132000 A1 May 14, 2015

(51) Int. Cl.
*H04J 14/02* (2006.01)
*H04B 10/24* (2006.01)
*H04B 10/2581* (2013.01)

(52) U.S. Cl.
CPC ............ *H04B 10/2581* (2013.01); *H04J 14/02* (2013.01)

(58) Field of Classification Search
CPC .................................................... H04B 10/116
See application file for complete search history.

(56) References Cited

U.S. PATENT DOCUMENTS

| 4,023,887 | A | | 5/1977 | Speers | |
|---|---|---|---|---|---|
| 4,107,517 | A | | 8/1978 | Cooper | |
| 5,691,827 | A | * | 11/1997 | Kamei | H04N 1/40093 358/462 |
| 6,548,967 | B1 | * | 4/2003 | Dowling | G06Q 30/0201 315/307 |
| 6,807,372 | B1 | | 10/2004 | Lee et al. | |
| 8,009,325 | B1 | * | 8/2011 | Borg | H04N 1/6058 345/604 |
| 8,941,513 | B1 | * | 1/2015 | Dupont | H03M 7/6088 341/50 |
| 8,949,466 | B1 | * | 2/2015 | Crosbie | H04L 47/38 709/247 |
| 2007/0195840 | A1 | * | 8/2007 | Hosking | H01S 5/06825 372/38.07 |
| 2008/0253766 | A1 | * | 10/2008 | Yu | H04B 10/1143 398/41 |
| 2010/0003032 | A1 | * | 1/2010 | Houle | H04J 14/0227 398/79 |
| 2010/0124272 | A1 | | 5/2010 | Fein et al. | |
| 2011/0091153 | A1 | * | 4/2011 | Dahlfort | G02B 6/4201 385/15 |
| 2012/0063766 | A1 | * | 3/2012 | Matsukawa | H04B 10/0793 398/20 |
| 2012/0082469 | A1 | * | 4/2012 | Xia | H04B 10/572 398/196 |
| 2012/0144148 | A1 | * | 6/2012 | Seo | G06F 3/0679 711/170 |
| 2012/0218314 | A1 | * | 8/2012 | Purdy | G09G 3/3208 345/690 |
| 2014/0072064 | A1 | * | 3/2014 | Lemson | H04B 10/25753 375/267 |
| 2014/0145866 | A1 | * | 5/2014 | Lee | H03M 7/6088 341/87 |
| 2014/0233945 | A1 | * | 8/2014 | Jeong | H04J 14/0221 398/34 |
| 2014/0341589 | A1 | * | 11/2014 | Schmid | H04B 10/116 398/131 |
| 2014/0375217 | A1 | * | 12/2014 | Feri | H05B 37/0272 315/151 |
| 2015/0104184 | A1 | * | 4/2015 | Jeffrey | H04L 9/3271 398/130 |
| 2015/0155937 | A1 | * | 6/2015 | Jeffrey | H04B 10/116 340/815.4 |
| 2015/0155938 | A1 | * | 6/2015 | Jeffrey | H04B 10/116 340/815.4 |
| 2015/0280740 | A1 | * | 10/2015 | Cho | H03M 7/60 341/106 |

* cited by examiner

*Primary Examiner* — Ken N Vanderpuye
*Assistant Examiner* — Amritbir Sandhu
(74) *Attorney, Agent, or Firm* — Shanti Hill, Esq.; Beusse Wolter Sanks & Maire, PLLC

(57) ABSTRACT

Systems comprising at least an encoder for receiving a binary string of a data, the encoder adapted to partition the binary string into one or more binary substrings and assign a color to each one or more substrings corresponding to a color model, a controller for converting the color into electrical pulses, a light source for emitting the electrical pulses as pulses of colored light for transmission of the pulses through a communication channel. A parallel decoder may be included. The system is preferably coupled with a data compression system for compressing or decompressing binary data via a two bit partitioning scheme and replacing same with a compression key generated by the assembly of each packet with at least a second value for transmittal using the color mechanism above.

18 Claims, 10 Drawing Sheets

Figure 8

| Binary String | R | G | B |
|---|---|---|---|
| 1111111100000000000000000 | 255 | 0 | 0 |
| 0110011001100110101111111 | 102 | 102 | 255 |
| 0011001110011001010011001 | 51 | 204 | 153 |
| 1111111111111110101100110 | 255 | 255 | 102 |
| 1111111100000000011001100 | 255 | 0 | 204 |
| 0011001110011001101111111 | 51 | 204 | 255 |
| 0011001100110011000000000 | 51 | 51 | 0 |
| 0011001100110011100110011 | 51 | 51 | 153 |
| 1111111110011001100110011 | 255 | 153 | 153 |

# VARIABLE COLOR DATA TRANSMISSION

FIELD OF THE INVENTION

The present invention relates generally to the field of devices for transmitting and receiving data.

COPYRIGHT

Copyright—A portion of the disclosure of this document contains material that is subject to copyright protection. The copyright owner has no objection to the facsimile reproduction by anyone of the patent document or the patent disclosure, as it appears in publically available Patent and Trademark Office patent files or records, but otherwise reserves all copyright rights whatsoever. The following notice applies to the software, data and/or screenshots which may be described below and in the drawings that form a part of this document: Copyright Nicolas T. M. Dupont, All Rights Reserved.

BACKGROUND

Current methods for transmitting data over optical fibers employs an on/off signaling system using regular light to transmit binary code. The light transmitted is generally one wavelength (color) and detected by sensors on the receiving end adapted to receive the wavelength of light.

The wavelength of light used is a standard chosen by the IEEE. For example, fiber communication uses predominantly white light. The color of light used is a choice based on the sensor used to detect the light and its capabilities, meaning the wavelength of light the sensor is adapted to detect. Sensors currently used in fiber communications detect one wavelength of light only.

The only use of colors in connection with data transfer involves separating channels for sending data. For instance, wavelength division multiplexing or "WDM" is the use of multiple optical channels and the combination of them in one fiber. Multiplexing does not increase the throughput of a single channel (meaning a channel for transmitting a particular data file, for instance), but rather allows for multiple channels to travel over a single fiber, thereby allowing for cheaper running costs over large distance. While WDM allows multiple data files to be sent simultaneously (each file being assigned a color), multiplexing does not affect speed of each data file's transfer itself.

Furthermore, multiplexing still makes use of the binary on/off flashing for transmitting data. The only difference is that binary code is transmitted at a given color, depending on the channel. For instance, Data A is green and Data B is red. One limitation of the binary system for the transmission of data is that there is a physical limitation to the transfer speed. For example, because binary is a series of bits represented as zeroes and ones, effective transfer speed requires billions of 0/1 bits per second. It is not possible to get such throughput in current technology. Improvements in the area of data transmission focus on increasing throughput as opposed to improving the efficiency of binary itself. There are currently no viable alternatives to binary transfer, and as a result, binary is ubiquitously employed The background description provided herein is for the purpose of generally presenting the context of the disclosure. To the extent that work of the inventor hereof is described in this background section, as well as aspects of the invention that may not otherwise qualify as prior art at the time of filing, they are neither expressly nor impliedly admitted as prior art against the present disclosure.

SUMMARY

Methods, systems, and apparatus, including computer program products (referred to collectively for convenience as the "system") are disclosed for a data transmission system using 16,777,216 colors to represent binary data. In one embodiment, the use of colors to represent binary data allows for a transmission speed of $1.295 \times 10^{53802}$ bits per second over an optical fiber. Part of this disclosure is the recognition that a Red Green Blue (RGB) spectrum of 255 shades of each main color allows for 16,777,216 colors and that this wide range of colors may be harnessed for use in data transmission. As described in the Detailed Description, this is done by recasting any binary string as RGB code and transmitting the RGB code, in light flashes, through a fiber. This patent application discloses the system's data transfer aspect, input transcription, physical transfer, and output transcription, and variations thereto within the scope of this disclosure.

The disclosed system attacks the problem of transfer speed at its source (limitations on traditional binary transmission) in addition to improving transfer speed. The preferred embodiment comprises at least one transmitting terminal or receiving terminal, or both, or a plurality of both, in communication with at least one fiber. The transmitting terminal and the receiving terminal further comprise a computerized device for communicating with a fiber for data transmission. The computerized device in the preferred embodiment further comprises at least an encoder for converting binary code into RGB code, an LED Controller for transcoding the RGB code into simple electrical pulses, and a light emitting diode (LED) for emitting the pulses into an optical fiber assembly. In another embodiment, the system also includes a parallel decoder. In yet another embodiment, the system may comprise a plurality of computerized devices, connected by at least one fiber, having an encoder or decoder or both for receiving and transmitting the data which has been coded/decoded as RGB code, respectively.

In another embodiment, one or a plurality of computerized devices further includes the data compression system disclosed in U.S. patent application Ser. No. 14/080,248 filed Nov. 14, 2013, to Nicolas T. M. Dupont, the content of which is incorporated by reference. In this embodiment, this data compression system may be coupled to the encoder and decoder of the present system, respectively, and serves to compress data prior to conversion to RGB code (at the encoder) and decompress data after de-conversion from RGB code to binary (at the decoder). The system may also receive data compressed via other schemes.

In another embodiment, the system may comprise at least one processor, storage, memory and input/output, together in communication via a system bus, where the system further comprises a printed circuit board (PCB) housing an encoder (also referred to herein as an encoding chip) in communication with an LED controller and LED for transmitting light of varying wavelengths. At the encoding chip, binary code (which may be binary code previously compressed) is broken into 24 bit packets and assigned a color corresponding to that 24 bit code in RGB code. (See also FIG. 8 and the corresponding discussion). The colors corresponding to the 24 bit packet are then transmitted by an LED Controller to an LED.

The system preferably also includes a data receipt assembly. For receiving data, the system comprises a sensor (preferably a CMOS sensor) for receiving pulses of light coupled with a decoding chip (also referred to as "decoder"). At a receiving terminal, once the data has been emitted by the LED of the transmitting terminal, the data is sent through an optical fiber linking to another PCB housing at least an RGB light sensor and a decoder. Once the data is received by the RGB light sensor, it is directed to the random access memory (RAM) of the receiving terminal in order to be processed by the decoder. The decoder regenerates the binary string by decoding the RGB colors back into their corresponding 24 bit binary pattern and reassembling the binary string for output to a CPU, for example. If the binary string which was encoded represents a compressed file, the regenerated binary string would be decompressed by the receiving terminal as well. Preferably, both terminals comprise at least an encoder and decoder enabling both the transmittal and receipt of data handled as disclosed herein.

Because the data transmitted is in variable colors, the system differs from binary transmission where one data stream is sent in one wavelength of light in on off flashes representing binary zeroes and ones. However, because the system permits decoding of binary into RGB code, the system is interoperable with binary. This is advantageous as the binary system is ubiquitously employed and interoperability enables the use of the system in conjunction with existing systems.

Variations are contemplated and made part of this summary as detailed in the Detailed Description. These include but are not limited to the use of other color code schemes, other light sources, or other hardware configurations for converting binary to color code and transmitting the same over a fiber. The sensor is preferably a CMOS sensor, but other light sensors may be used. Also, while an LED is preferable in terms of cost and color range, other sources of light may be used.

BRIEF DESCRIPTION OF THE DRAWINGS

FIG. 8 shows a sampling of 24 bit bit-patterns and their corresponding code in the RGB color model.

DETAILED DESCRIPTION

An apparatus, system, and method is disclosed for transmitting data using variable colors (referred to collectively as the "system" for convenience). FIGS. 1-10 show the preferred embodiment of the system, although variations are considered part of this disclosure and are explained in further detail below.

The system preferably comprises a transmitting terminal (also referred to as "Device 1") 101 and receiving terminal (also referred to as "Device 2") 103. Preferably, Device 1 and Device 2 are separate terminals, such as two computerized devices connected by fiber 105. Device 1 and Device 2 may also be housed on the same component in communication with one another.

Figure 1:
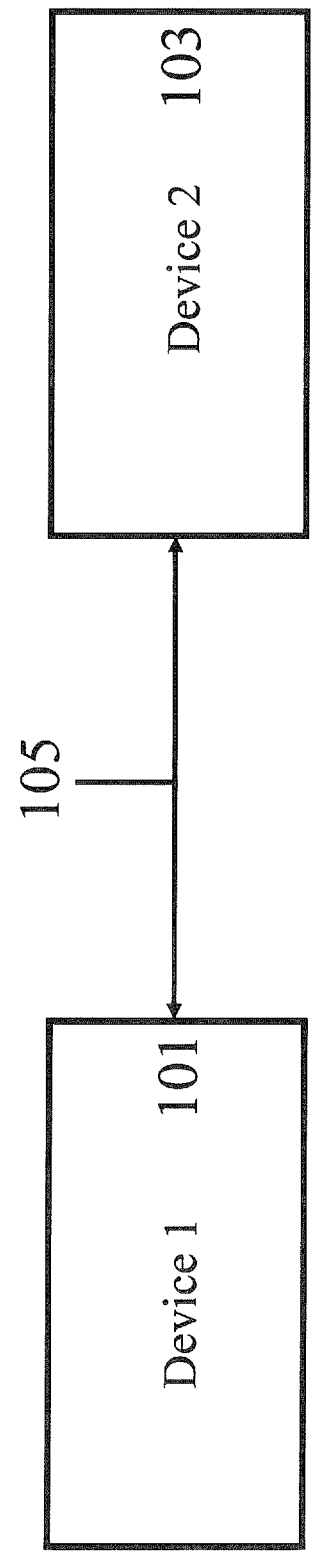
FIG. 1 shows a receiving terminal and a transmitting terminal connected via a communication channel in accordance with an embodiment.
Figure 2:
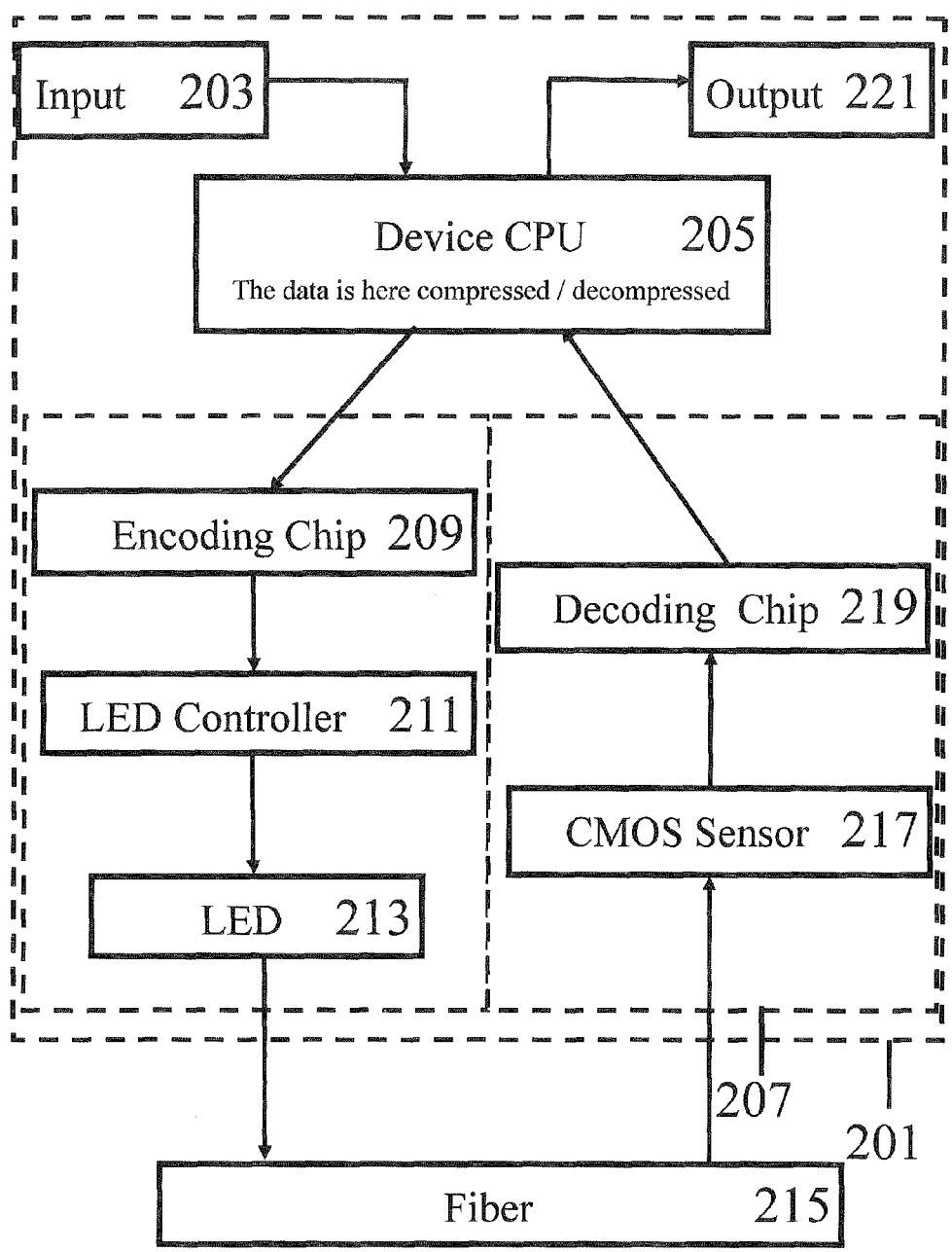
FIG. 2 shows an embodiment of the system.

FIG. 2 shows an embodiment of the hardware components of Device 1 and Device 2. In the preferred embodiment, FIG. 2 shows a close-up of one of the devices 201 having Input 203 for receiving data. Input 203 is data received from any data source in binary format. Data can come from the Internet, a disc, a USB key, etc. Input 203 is transmitted to a Device CPU 205, the processor of which is described in more detail later in this disclosure. Data is preferably data compressed by CPU 205 in conjunction with other componentry described in and in accordance with the system and method disclosed in related U.S. patent application Ser. No. 14/080,248 to Nicolas T. M. Dupont, filed Nov. 14, 2013, the disclosure of which is incorporated by reference. The Device housing the Device CPU 205 may be a computer, a mobile phone, or any other hardware capable of receiving data and containing a CPU.

In the preferred embodiment, Device CPU 205 communicates with components housed on a Printed Circuit Board ("PCB") 207. The PCB comprises at least one Encoder 209 (also referred to as the "Encoding Chip") where data is encoded from binary format into RGB format. RGB format refers to Red Green Blue format, which holds an array of 255 shades of each of these three primary colors. The Encoding Chip 209 then passes data (now in RGB format) to an LED Controller 211. The LED Controller 211 is a controller for transcoding data into simple electrical pulses and may be a commercially available LED controller. The LED Controller 211 sends electrical pulses to an LED 213 which then emits different colors through a fiber 215. LED is any single or multiple-bulb LED that can emit all three of the primary additive colors, red, green, and blue in varying intensities in accordance with the RGB color coding model.

Although referred to as the transmitting terminal and the receiving terminal, the preferred embodiment is constructed with Device 1 101 and Device 2 103, both of which are adapted to receive and transmit data. If the Device 201 is receiving data, that data comes into the device in the form of light from fiber 215. The light comes in from the fiber 215 and is received by sensor 217. The preferred embodiment comprises a complementary metal-oxide-semiconductor (CMOS) sensor, however any type of a light source detector capable of converting light into electronic signals may be used, such as a charge-coupled device (CCD). A CMOS sensor may be a camera sensor and is preferable because it is adapted to capture a full 24 bit spectrum of 255 colors of RGB and is generally lower in cost than a CCD.

Continuing with FIG. 2, the CMOS sensor 217 then outputs RGB Code (data in this format) and sends this data to the decoding chip 219. The decoding chip 219 decodes the RGB format in to its corresponding 24 bit binary string, reassembles the packets of 24 bit binary strings into the original binary string (which was encoded at the encoder), and at this point may send the string to the Device CPU 205 (also referred to as processor 1003), preferably to be decompressed (if used in conjunction with a compression system) and accessed, and then to the output 221. Output is also described further in FIG. 10.

Figure 3:
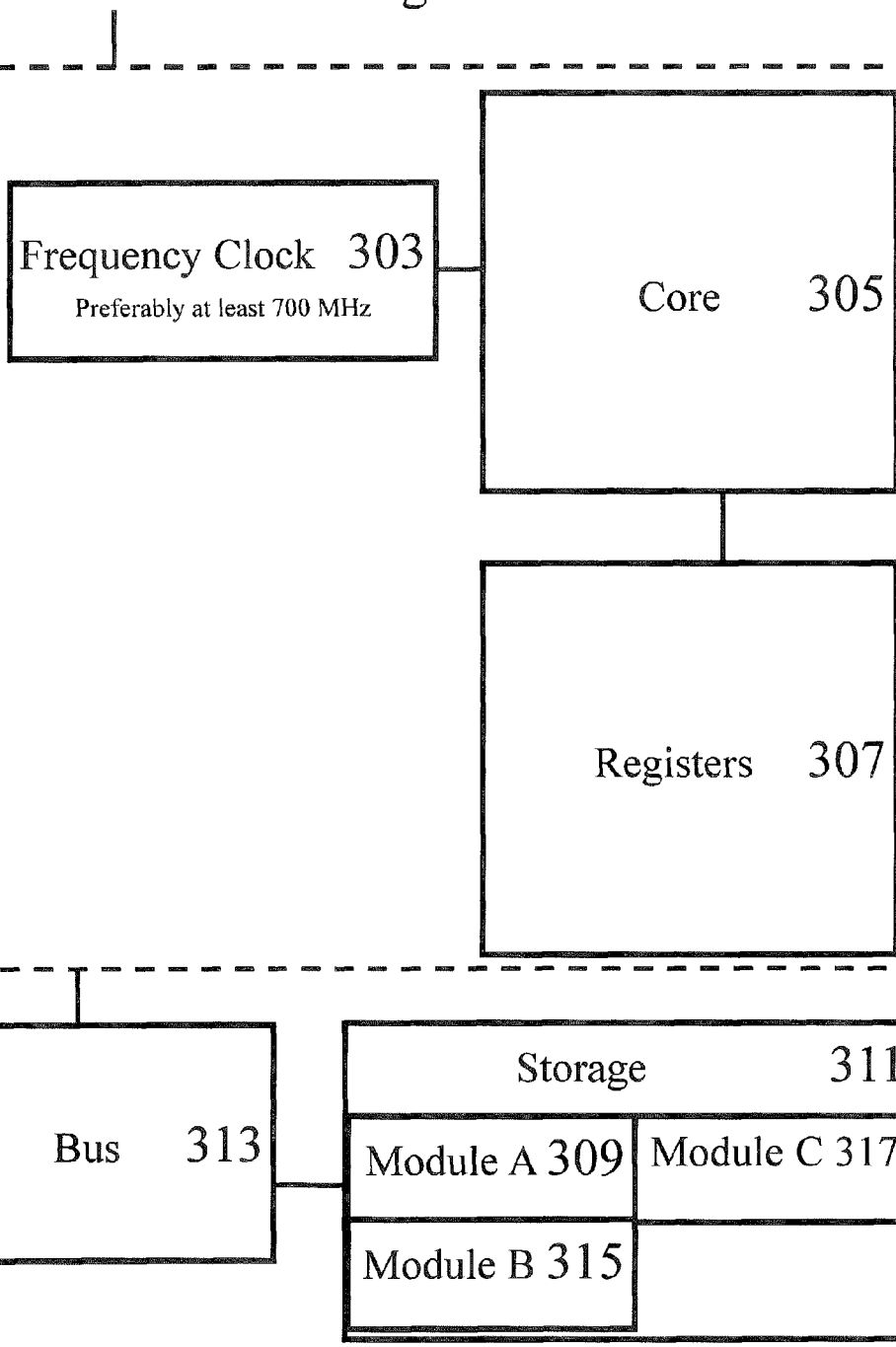
FIG. 3 is a detail view of a PCB in accordance with an embodiment.
Figure 10:
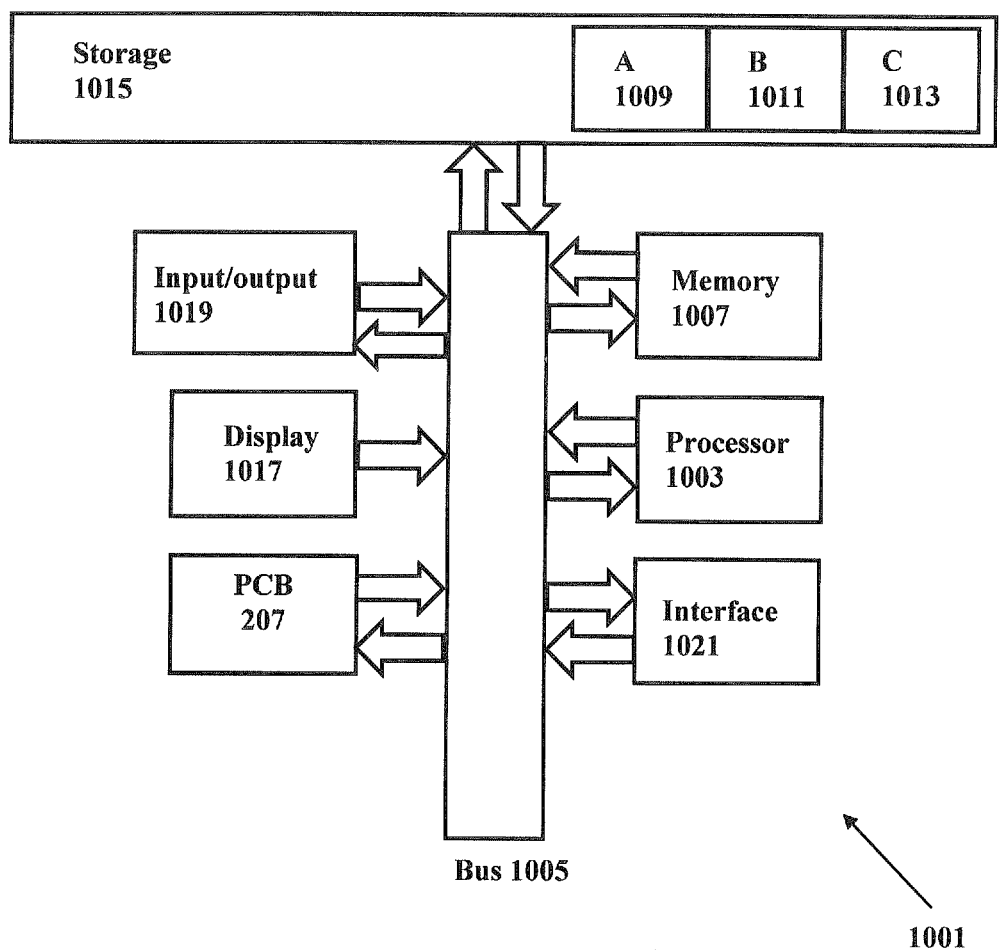
FIG. 10 shows an exemplar hardware architecture for an embodiment of the system.

FIG. 3 shows a detail view of PCB 207 (having an encoder 209, decoder 219, LED Controller 211, LED 213, and CMOS sensor 217) coupled with a bus and storage. This configuration may be coupled with other componentry as shown in FIG. 10. In the configuration shown in FIG. 3, PCB 207, 301 comprises a central processing unit capable of running preferably at least 700 MHz. (The processor also depicted in FIG. 10 at 1003). It further comprises at least a frequency clock 303 and at least one core 305 for processing (preferably at least 128 KB) coupled with at least one register 307 capable of holding the data briefly prior to being sent to the LED Controller 211, plus preferably a module containing program instructions (here as "Module A") 309 for instructing the processor to perform the compression method described in U.S. patent application Ser. No. 14/080,248, which program instructions may be loaded as firmware. "Module A" shown in FIG. 3 may be stored in read only memory/storage 311 coupled to the PCB via bus 313. In the Storage, Module B 315 preferably comprises at least program instructions for the encoder to encode binary to RGB code are present. Module C 317 is also present and may be program instructions for the decoder to decode RGB code to binary form. Other modules may be used or combined with existing modules, such as program instructions for the LED Controller firmware.

It should be noted that the Figures depict an embodiment of the hardware configuration for the system, however other configurations are contemplated and made part of this disclosure. For example, because the data transmitted through the PCB is preferably compressed in accordance with the system and method disclosed in U.S. patent application Ser. No. 14/080,248, the preferred embodiment does not include Random Access Memory (RAM) at this location, however, variations with RAM do not depart from the scope of this disclosure. The PCB must also be coupled to a power source (not pictured), for instance a Peripheral Component Interconnect (PCI) power source of 5.1V. PCB 207 is also coupled to an input/output 1019. There may be transistors in the PCB for handling power (not pictured in FIG. 4, for example, because the PCB 207 is preferably made to be used in a motherboard coupled with its own power source.)

Figure 4:
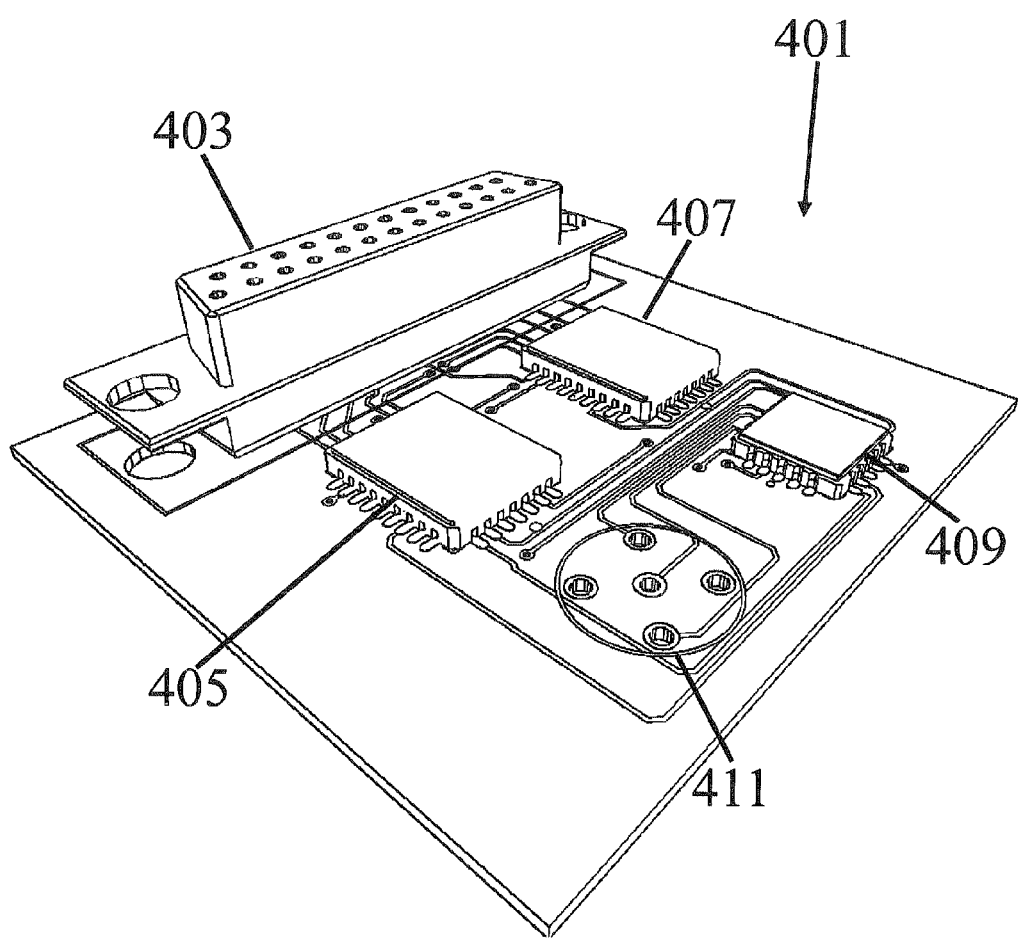
FIG. 4 is a perspective view of a PCB for housing components of an embodiment of the system.

FIG. 4 shows a perspective view of the preferred embodiment of a PCB 401, provided to further illustrate the hardware. Connector 403 can be any plug capable receiving and outputting data along with providing a connection to a power source, such as a standard metal connector. Shown is a standard extended VGA connector, however, it can be any connector with similar capability. Also shown are the encoding chip 405, the decoding chip 407, and the LED controller 409, and the LED and CMOS output 411. LED and CMOS output 411 is shown depicted with five circles, two corresponding to the positive and negative terminals for input/output respectively, and one central circle depicting the ground. The core/register/clock referred to in FIG. 3 are not shown in this diagram for ease of view.

Figure 5:
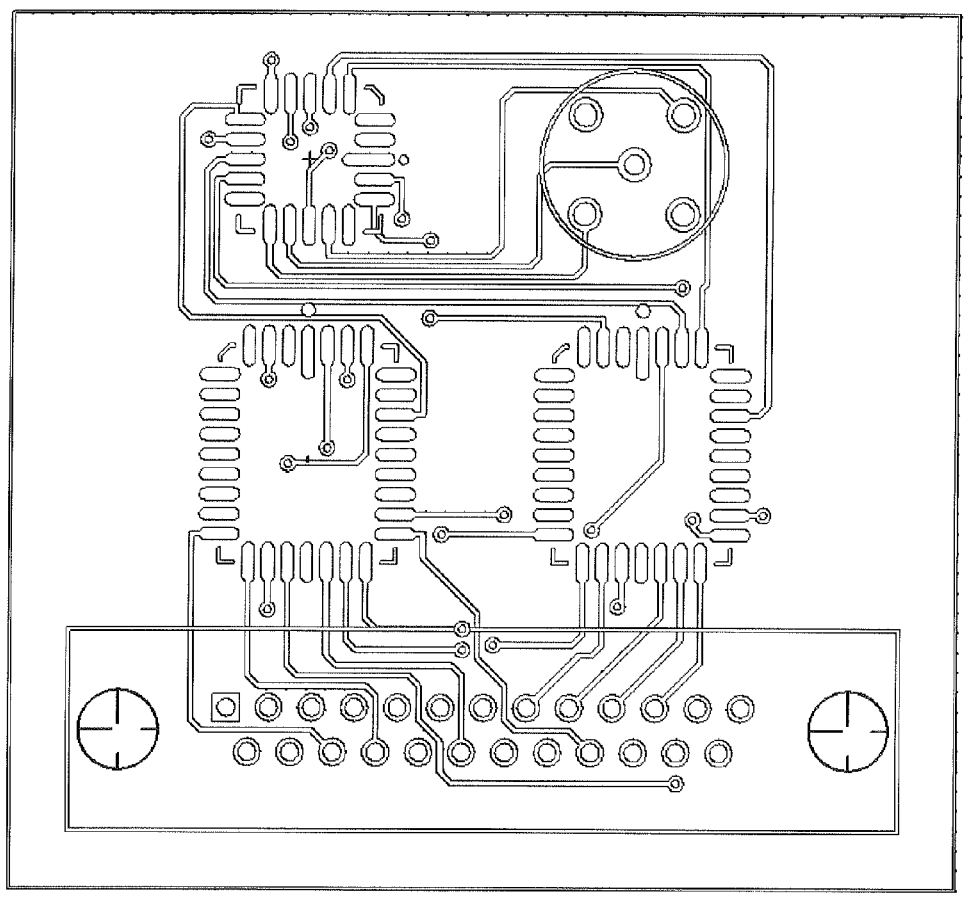
FIG. 5 is an alternate view of the PCB for housing components of an embodiment of the system.
Figure 6:
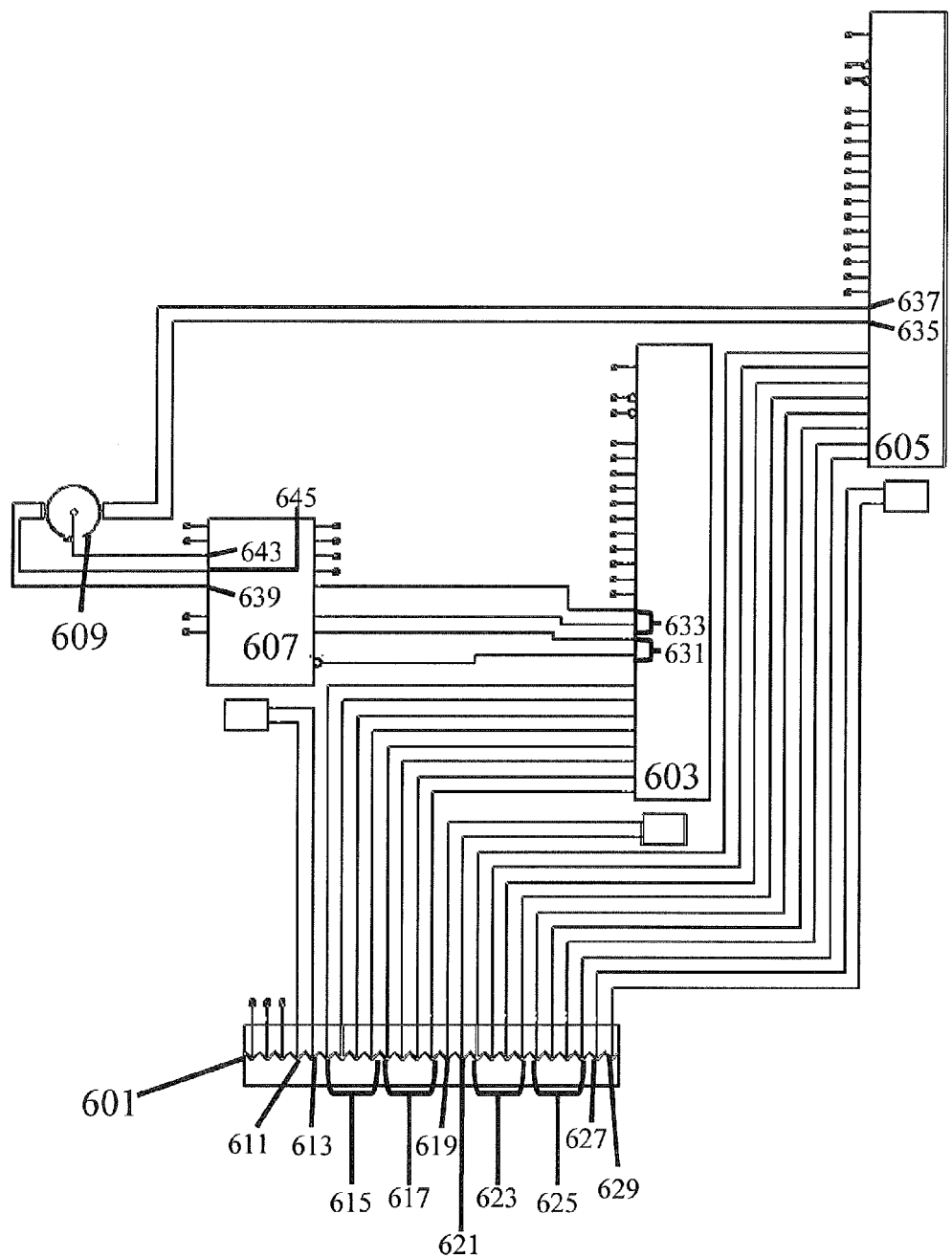
FIG. 6 shows the connections between components housed on the PCB in accordance with an embodiment.

FIG. 5 is another view of the PCB. This figure has been provided for illustrative purposes. FIG. 6 is a detailed schematic of an embodiment of the PCB. Connector 601, encoding chip 603, decoding chip 605, LED Controller 607, and LED and CMOS sensor output 609 (also referred to simply as "output")(this is where the optical fiber would connect). Connections are explained in the followings:

Connection 611 is the negative power connection for chip 607.

Connection 613 is positive power for chip 607

Connections 615 are the positive input for chip 603

Connections 617 are the negative input connections for chip 603

Connection 619 is the negative power connection for chip 603

Connection 621 is the positive power connection for chip 603

Connections 623 are the positive data output connections for chip 605

Connections 625 are the negative data output connections for chip 605.

Connection 627 is the negative power connection for chip 605.

Connection 629 is the positive power connection for chip 605.

Connections 631 are the negative data connections from chip 603 to chip 607

Connections 633 are the positive data connections from chip 603 to chip 607

Connections 635 are the negative data connections between chips 605 and output 609.

Connections 637 are the positive data connections between chip 605 and output 609.

Connection 639 are the negative data connections from chip 607 to output 609.

Connection 643 are the positive data connections from chip 607 and output 609.

Connection 645 is the ground connection from chip 607 to output 609.

Figure 7:
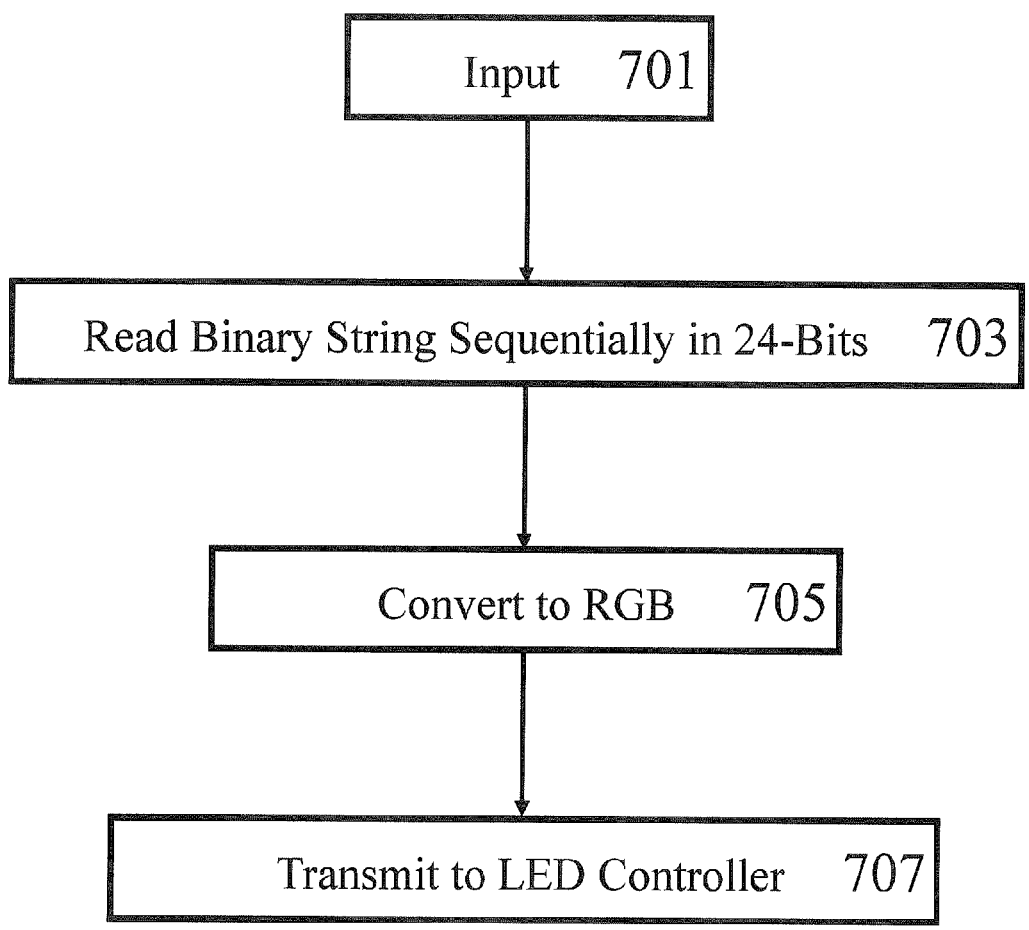
FIG. 7 shows a method for encoding data at the encoding chip in accordance with an embodiment.

FIG. 7 shows the detail process performed by the encoder 209. By way of example of the method employed by the system, a binary string of 1 MB corresponds to a $8 \times 10^6$ bit file. In order to transmit the 1 MB string, the string would first be read sequentially in 24 bit packets. This can also be explained as breaking the binary string in 24 bit packets. For the purpose of this example, the 24-bit packet will be referred to as a substring. There are $3.33 \times 10^5$ 24-bit substrings in the binary string and a remaining 8 bits. For the first $3.33 \times 10^5$ 24-bit substrings, the corresponding color associated with that particular 24-bit binary substring would be assigned (step 705) and transmitted to the LED Controller 707.

The remaining 8 bits would be built up to 24 bits using a standard convention, for example, assigning all zeros to build up the last 8 bits to a 24 bit substring. The last substring would also then be assigned the RGB color corresponding to the built-up substring. Once the binary string has been converted to RGB in this manner, the RGB code is sent to the LED Controller 707, which converts the RGB code into electrical pulses directing the LED to flash the colors corresponding to the binary string, sequentially.

To further illustrate the method, FIG. 8 shows a random selection of 24 bit binary strings and their corresponding color in RGB code. These 24 bit substrings may be packets or substrings taken from a much longer binary string corresponding to the original data (or compressed data), FIG. 8 illustrates that each 24 bit packet would correspond to a particular shade of the Red, Blue, and Green of the RGB code. For example, for the first string, 111111110000000000000000, the corresponding color would be a combination of R 255, G 0 and B 0. This corresponds to a particular color that the LED controller will direct the LED to transmit.

Figure 9:
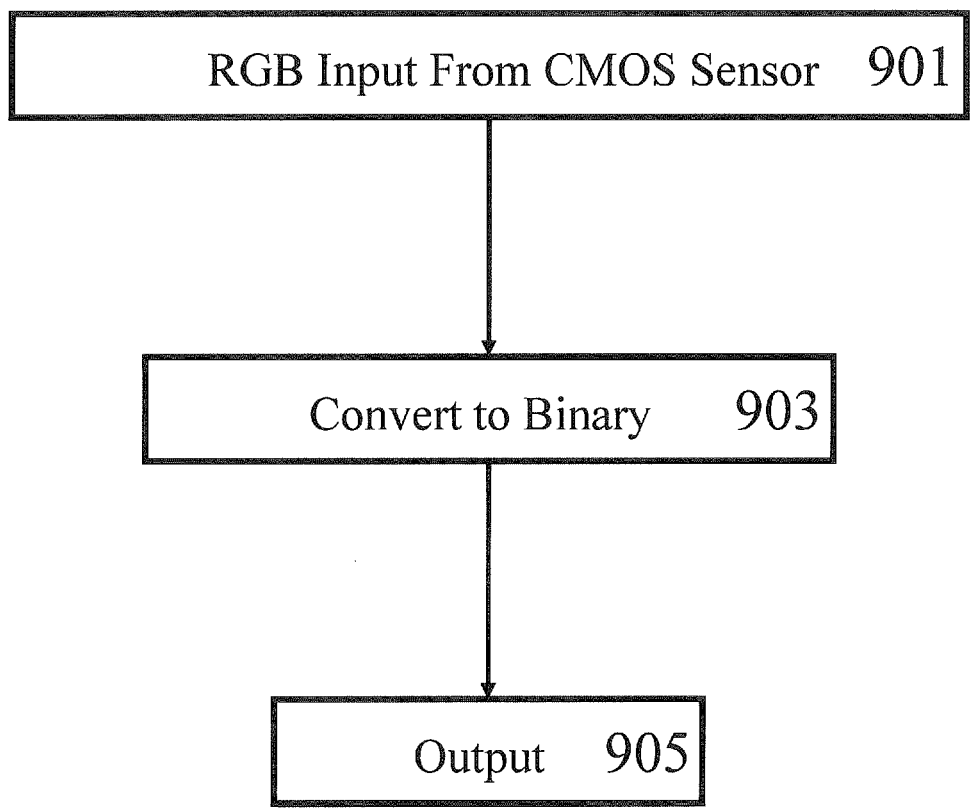
FIG. 9 shows a method for decoding data at the decoding chip in accordance with an embodiment.

FIG. 9 shows the operation performed by the decoder ("decoding chip" in the preferred embodiment). RGB is received by the sensor 901. This color is then converted back in to the corresponding 24 bit binary pattern 903. If the original data is not perfectly divisible by 24 bits, the same convention may be employed to "build up" the last substring to 24 bits for transmission as a color. Another way of explaining this is that it often occurs that the data itself is not divisible by the bit depth of the color used. In the case of the example provided, if an 8-Bit string is sent into the Encoding Chip 209; the Encoding Chip 211 will "see" it as a 24-Bit string, but the last 16-Bits will simply be zeroes. The decoding chip 219 will therefore decode it back into a 8-bit string due to its knowledge of the size of the string in the first place.

It should be noted that by converting the binary string of a given file to RGB code for file transmission, the number of flashes will be reduced (in the 1 MB example, $8 \times 10^6$ flashes corresponding to the binary on/off transmission is larger than $3.33 \times 10^5$ flashes of color with the RGB transmission). As mentioned previously, however, the preferred embodiment of the system employs the data compression method of U.S. patent application Ser. No. 14/080,248 for first compressing an original data file into a shorter binary string, then transmitting the compressed string as colored flashes as described above. The preferred embodiment also comprises a subsequent parallel decompression following decoding of the colored flashes at the receiving terminal. Therefore the overall improvement in data transmission in the preferred embodiment is due both to the decreased file size being transmitted and the improvement in using color flashes as opposed to binary on/off flashes for transmitting the compressed data through the optical fiber.

System Architecture:

A hardware embodiment of the system is provided in FIG. 10. FIG. 10 depicts a hardware environment for performing one or more of the operations herein. These blocks or a subset of these blocks may be integrated into a device, such as a smartphone or tablet for performing the described methods. A computing device, which may be a network of computing devices, can be used to practice the embodiments described. The system preferably includes a transmitting terminal 101 or a receiving terminal 103, or both in communication. Terminals 101 and 103 may actually be physically separate terminals or be housed on one or a plurality of overarching devices, such as in the preferred embodiment where each terminal has both transmission and receipt capabilities (having both an encoding chip and decoding chip, and associated hardware). In one embodiment each of the terminals 101, 103 includes central processing unit (or processor) 1003 for executing the compression and decompression, memory, storage, and input/output devices, RBG encoding and decoding, LED Controller operation and LED operation, each of which are interconnected via a system bus 1005 that couples various system components including the memory to the processor. Modules can be configured to control the processor to process instructions for execution within the system. For instance, the system preferably comprises a chip including firmware (ex. Module A 1009) for performing the RGB encoding or decoding or both. Such executed instructions can implement one or more components of the system, for example, the chunking of a data file's binary string into 24-bit packets and assigning the RGB color code corresponding to the particular 24 bit pattern. Alternatively, these steps may be performed by separate modules, such as Module B storing instructions for performing the decoding RGB code back into 24 bit binary strings and subsequent reassembly into a longer string 1011, and Module C 1013 for storing instructions for compressing and decompressing an original data file in accordance with the method described in U.S. patent application Ser. No. 14/080,248. It should be noted that storage 1015 may be remote or local to the system. The processor is capable of processing instructions stored in memory or storage and may optionally display graphical information on an output device (such as the display 1017 of a user interface 1021 whereby a user may interact with the system to select files to be compressed or transmitted), said output device preferably comprising output devices associated with a user device used by a user, such as a tablet or smartphone.

Memory 1007 may include multiple different types of memory with different performance characteristics and may be read only memory and random access memory. The disclosure may operate on a computing device with more than one processor or on a group of networked computing devices, servers, or a combination of both. The system can include clients and servers. A client and server are usually remote and interact via a communication network and are programmed to interact in a client/server relationship.

Processor 1003 may include any general purpose processor and a hardware module or software modules stored in storage, configured to control the processor as well as a special-purpose processor where program instructions are incorporated into the actual processor design. ARM processors and standard smart-device processors are adequate to handle the RGB encoding and decoding, along with the compression methods disclosed, with approximately less than 2% stress on the CPU. The system may also comprise a smaller device processor as well, powered by a microcontroller. The processor may be a completely self-contained computing system, containing multiple cores or processors, a bus, memory controller, cache, etc. A multi-core processor may be symmetric or asymmetric. The preferred system embodiment is presented as including individual functional blocks including functional blocks labeled as a "processor" or processor. The functions of one or more processors may be provided by a single shared processor or multiple processors. (The term "processor" should not be construed to refer exclusively to hardware capable of executing software, and as used herein is also referred to as a "processing device.") Illustrative embodiments may include microprocessor and/or digital signal processor hardware, read only memory for storing software performing the operations discussed above, and random access memory for storing results.

Bus 1005 may be any of several types of bus structures including a memory bus or memory controller, a peripheral bus, and a local bus using any of a variety of bus architectures. A basic input/output (BIOS) stored in read only memory or the like, may provide the basic routine that to assist in the transfer of information between elements within the computing device, such as during start-up. The computing system further includes storage such as a hard disk drive, a magnetic disk drive, an optical disk drive, tape drive or the like. Storage can include software modules, for example, for controlling the processor 1003. Other hardware or software modules are contemplated. The storage device is connected to the bus by a drive interface. Input data to be compressed may be fed from the storage device having a plurality of memories connected to corresponding subprocessors. The drives and the associated computer-readable storage media provide nonvolatile storage of computer-readable instructions, data structures, program modules and other data for the computing device.

Input/Output 1019 may be a connection to a communication channel 105, for the receipt and transmission of data, respectively. This may be a wireless communication channel or a physical fiber, such as an optical cable. In the preferred embodiment, a file to be transmitted is input into the system at input 1019, then compressed according to the instructions in, for example Module C 1013, and are then executed by processor 1007. Module A 1009 is then used to convert the compressed file's binary string into RGB code, such operation taking place on preferably PCB 207's encoding chip 209. Modules A-C are used as examples, but more modules may be employed or a combination of functions performed at one module.

In one embodiment, a hardware module that performs a particular function includes the software component stored in a non-transitory computer-readable medium in connection with the necessary hardware components, such as the processor, bus, display (optional), and so forth, to carry out the function. The system may include a user interface for allowing users to choose certain files to be compressed (not pictured), visible to a user via a display. As mentioned previously, the system may further comprise a display 1017 or interface 1021 or both whereby a user may interact with the system, for example, to select files to compress or transmit or both. In embodiments including a display, "display" refers to visually perceptible display on a display device (such as a networked computing device for example, an end user's device) resulting from a tangible computer file stored in its memory. This may originate from across a network, such as the Internet, a wireless communication network, or a system of connected networked computers. The display includes devices upon which information can be displayed in a manner perceptible to a user, such as a touchpad or touchscreen display, a computer monitor, an LED display, and the like means known in the art for producing visually perceptible output. The basic components are known to those with skill in the art and appropriate variations are contemplated depending on the type of device; the term "computing device" refers to any device, such as a user device, with processing capability such that it can execute instructions, for example, tablets, smartphones, PC computers, servers, telephones, and other similar devices.

To enable user interaction with the computing device, an interface 1021 represents any number of input mechanisms, such as a microphone for speech, a touchscreen for gesture or graphical input, keyboard, mouse, motion input, speech, etc. An output device can also be one or more of a number of output mechanisms known to those of skill in the art. In some instances, multimodal systems enable a user to provide multiple types of input to communicate with the computing device. The communications interface generally governs and manages the user input and system output. There is no restriction on operating on any particular hardware configuration and the basic componentry here may easily be substituted for improved hardware or firmware arrangements as they are developed.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the disclosed methods and/or can operate according to instructions in the recited non-transitory computer-readable storage media. Such logical operations can be implemented as modules configured to control the processor to perform particular functions according to the programming of the module (for example, modules controlling the processor to perform particular steps or a series of steps. However additional or fewer modules may be used). These modules may be stored on the storage and loaded into random access memory or memory at runtime or may be stored as would be known in the art in other computer-readable memory locations.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions. Although the exemplary embodiment described herein employs the hard disk, storage, those skilled in the art appreciate that other types of computer-readable media may also be used in the exemplary operating environment. Non-transitory computer-readable storage media expressly exclude media such as energy, carrier signals, electromagnetic waves, and signals per se.

Variations in the above embodiments made by those skilled in the art are contemplated and made part of this disclosure. For example, the preferred embodiment discloses makes use specifically of a 24 bit color depth because that is what CMOS sensors on the market presently can handle in terms of receipt and discernment of colors. However different types of color depth may be used in the near future in order to increase physical bandwidth with further developments in CMOS sensors or any other sensor capable of receiving color. Another variation is in the type of light used to transmit the data in flashes. This invention uses visible light in the range of 400 nm-700 nm because the most economical way to practice the invention is using sensors to capture visible light. However, with advances in sensors for detecting other light, such as nonvisible light, (ex., UV or IR light), this disclosure would contemplate other spectra of light alone, in addition to, or in combination with the visible light spectrum.

Another variation is in the color model employed. The RGB color model is an additive color model in which red, green, and blue light are added together in various ways to reproduce a broad array of colors, however this disclosure is not limited to the RGB color model. The system may also utilize the CMYK color model (Cyan Magenta Yellow and Key) which is commonly used in color printing, although this color model is not as precise as RGB. The use of the CMYK model would increase the file size to be transmitted by 25 percent, but still would work. Another variation is CcCmYK color model which is an extension of the CMYK which allows for more precision in the color model. These are just a few examples, there are other color models and corresponding sensors that could be used. A color management system is preferable—with the sensor used specifically adapted to receive the colors emitted by LED 213.

In another embodiment, the variable color compression system disclosed is coupled with a compression system disclosed in U.S. patent application Ser. No. 14/080,248, the content of which is incorporated by reference. The combination of the binary compression scheme and the color compression scheme disclosed here allows for a compounded compression effect. This is because the binary compression scheme in U.S. patent application Ser. No. 14/080,248, would compress the original data's binary, output a new compressed binary string, which would then be further compressed and transmitted by the system herein disclosed.

Another variation contemplated is the use of the LED. The system may employ an LCD backlit by a mercury bulb or other source of light. An LED is preferred due to its low cost and low power requirements. An LED is also preferable because it allows for a single bulb to transmit multiple colors. Along these lines, one or a plurality of LED's may be used in the system for increasing the flash output. Light from the multiple LED's may also be coupled via a prism for transmission in glass fibers. The cable 105 itself may be varied. The cable 105 is preferably an optical cable, however other media could be used. For example, sensors are envisioned to capture color emitted in flashes through the air.

What is claimed is:

1. A system comprising
an encoder for receiving a binary string of a data, the encoder adapted to partition the binary string into one or more substrings and assign a color to each one or more substring corresponding to a color model;
a controller for converting the code into electrical pulses
a light source for emitting the electrical pulses as pulses of colored light for transmission of the pulses through a communication channel; and
a compression system for generating a compressed binary string to be encoded into a color code at the encoder, the compression system further comprising at least a processor for performing the compression method, the compression method comprising:
receiving a data comprising a first binary string;
determining the length of the binary string;
comparing the binary string with a lookup table comprising all possible bit patterns for a file of the length of the first binary string, wherein the possible bit patterns are partitioned in n-bit partitions, the n-bit partitions having a corresponding assigned value, the values of which are assembled by a given function so as to produce a code for each possible bit pattern;
replacing the first binary string with the code;
generating a compressed binary string to represent the code; and
relaying the compressed binary string into the encoder.

2. The system as in claim 1 further comprising
a sensor for receiving pulses of colored light; and
a decoder for decoding each pulse of colored light into the binary substring generated at the encoder, wherein the decoder also is adapted to reassemble the one or more binary substrings into the binary string.

3. The system as in claim 2, wherein the binary string is output to an operating system of a computing system.

4. The system as in claim 1 wherein the communication channel further comprises a fiber optic cable.

5. The system as in claim 1 wherein the color model is the RGB color model.

6. The system as in claim 1, wherein the color model is the CMYK model.

7. The system as in claim 1, wherein the color model is the CcMmYyK model.

8. The system as in claim 1 wherein the light source further comprises an LED.

9. The system as in claim 8, wherein the LED is a single or multibulb LED capable of generating Red, Blue, and Green in varying intensities.

10. A system comprising at least
a processor;
memory for storing instructions to implement a method, the method comprising
receiving data comprising a binary string;
partitioning the binary string into one or a plurality of substrings;
assigning each substring a color associated with the bit pattern of the binary substring for a given color model;
transmitting, to an LED Controller the color associated with the bit pattern of each substring, wherein the LED Controller is in communication with an LED for transmitting the color of each one or more substring through a communication channel; and
a terminal adapted to receive each color of each one or more substring through the communication channel, the terminal further comprising
at least one sensor for receiving each color;
at least a processor; and
memory for storing instructions that when executed cause the processor to
decode at a decoder the color of each one or more substring to the bit pattern associated with each color; and
reassemble the one or more substrings into the binary string.

11. The system as in claim 10, wherein the binary string is output to an operating system of a computing system.

12. The system as in claim 10 wherein the communication channel further comprises a fiber optic cable.

13. The system as in claim 10 wherein the color model is the RGB color model.

14. The system as in claim 10, wherein the color model is the CMYK model.

15. The system as in claim 10, wherein the color model is the CcMmYyK model.

16. The system as in claim 10 wherein the light source further comprises an LED.

17. The system as in claim 16, wherein the LED is a single or multibulb LED capable of generating Red, Blue, and Green in varying intensities.

18. The system as in claim 10 further comprising a compression system for generating a compressed binary string to be encoded into RGB code at the encoder, the compression system further comprising at least a processor for performing the compression method, the compression method comprising:
receiving a data comprising a first binary string;
determining the length of the binary string;
comparing the binary string with a lookup table comprising all possible bit patterns for a file of the length of the first binary string, wherein the possible bit patterns are partitioned in n bit partitions, the n bit partitions having a corresponding assigned value, the values of which are assembled by a given function so as to produce a code for each possible bit pattern;
Replacing the first binary string with the code;
Generating a compressed binary string to represent the code; and
Relaying the compressed binary string into the encoder of claim 10.

* * * * *